United States Patent
Kobiki et al.

(10) Patent No.: US 7,608,014 B2
(45) Date of Patent: Oct. 27, 2009

(54) DECELERATION CONTROL DEVICE FOR VEHICLE

(75) Inventors: Yasushi Kobiki, Toyota (JP); Yoshiharu Harada, Toyota (JP); Motoaki Kamimura, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 372 days.

(21) Appl. No.: 11/577,402

(22) PCT Filed: Aug. 3, 2005

(86) PCT No.: PCT/JP2005/014618

§ 371 (c)(1),
(2), (4) Date: Apr. 17, 2007

(87) PCT Pub. No.: WO2006/043364

PCT Pub. Date: Apr. 27, 2006

(65) Prior Publication Data

US 2007/0287595 A1     Dec. 13, 2007

(30) Foreign Application Priority Data

Oct. 18, 2004   (JP)   ............... 2004-302633

(51) Int. Cl.
*B60W 10/18* (2006.01)
(52) U.S. Cl. ............... 477/187; 477/185; 477/186

(58) Field of Classification Search ........ 477/182–187
See application file for complete search history.

(56) References Cited

U.S. PATENT DOCUMENTS

| 6,908,412 | B2 * | 6/2005 | Kurabayashi | 477/44 |
| 6,979,280 | B2 * | 12/2005 | Oshima et al. | 477/186 |
| 7,090,615 | B2 * | 8/2006 | Matsumura et al. | 477/78 |
| 7,252,622 | B2 * | 8/2007 | Shishido et al. | 477/116 |
| 7,280,902 | B2 * | 10/2007 | Seki | 701/70 |

FOREIGN PATENT DOCUMENTS

| JP | 63 38060 | | 2/1988 |
| JP | 6 94111 | | 4/1994 |
| JP | 11208437 A | * | 8/1999 |
| JP | 2001 200929 | | 7/2001 |
| JP | 2001 315625 | | 11/2001 |
| JP | 2002 249034 | | 9/2002 |

* cited by examiner

*Primary Examiner*—Ha D. Ho
(74) *Attorney, Agent, or Firm*—Oblon, Spivak, McClelland, Maier & Neustadt, L.L.P.

(57) ABSTRACT

A deceleration control device for a vehicle including an automatic transmission capable of changing the gear ratio by a shift operation of a driver. The control device controls the load of a brake actuator or engine so that the vehicle is decelerated, when the driver performs a shift operation, under conditions that it is determined that the driver has the intention to decelerate and the automatic transmission is not downshifted.

12 Claims, 3 Drawing Sheets

DECELERATION CONTROL DEVICE FOR VEHICLE

TECHNICAL FIELD

The present invention relates to a control device for a vehicle, and particularly relates to a control device for a vehicle equipped with an automatic transmission capable of changing the gear ratio by shift operation of a driver (manual shift).

BACKGROUND ART

Vehicles equipped with respective automatic transmissions have heretofore been sold. Some of the automatic transmissions automatically shift gears and additionally allow a driver to select a gear ratio (gear) by shift operation of the driver in order to shift gears as intended by the driver. The gear shifting by the driver's shift operation is effected by selection of a shift range that allows gear shifting to be done within a predetermined shift range or by selection of a gear.

Japanese Patent Laying-Open No. 2001-200929 discloses an operation device for an automatic transmission that can change the shift range. The operation device for an automatic transmission disclosed in Japanese Patent Laying-Open No. 2001-200929 is an operation device for an automatic transmission capable of setting the shift range by operation of a select lever supported on a lateral side of a vehicle seat. The operation device includes a main gate guiding the select lever to range positions corresponding respectively to P, R, N and D ranges, a sub gate that is a sub gate extending from the range position of the D range in the main gate in the vehicle's width direction and guiding the select lever to a shift-range changing position located near an end of the sub gate, a first detection switch that is made ON by driver's operation and a second detection switch configured separately from the first detection switch, and a control unit controlling the automatic transmission based on the operation of the select lever in the main gate as well as the first and second detection switches. The control unit controls the automatic transmission so that the shift range which determines the gear-shifting range of the automatic transmission is changed to a shift range of a wider gear-shifting range each time the first detection switch is made ON and so that the shift range is changed to a shift range of a narrower gear-shifting range each time the second detection switch is made ON.

Regarding the operation device disclosed in the above-referenced publication, driver's operation can cause the shift range which determines the gear-shifting range of the automatic transmission to change, from the state where the select lever is changed in position to the shift-range changing position, to a shift range of a wider gear-shifting range or a shift range of a narrower gear-shifting range, each time the first or second detection switch is made ON.

As for an automatic transmission configured with a planetary gear unit, there is a neutral state in which the output-shaft torque of the automatic transmission is substantially zero, between engagement and disengagement of frictional engagement elements of the automatic transmission when gear shifting is done. Therefore, even if a driver performs manual shift to downshift the automatic transmission for the purpose of effecting engine brake, a braking force as intended by the driver may not be obtained. Therefore, a technique has been proposed according to which a braking force is applied in the manual shift mode.

Japanese Patent Laying-Open No. 63-038060 discloses a brake control device for a vehicle that can provide a stable braking force in the manual shift mode. The brake control device for a vehicle disclosed in Japanese Patent Laying-Open No. 63-038060 includes manual shift detection means for detecting that the mode is the manual shift mode of an automatic transmission for effecting engine braking, engine load detection means for detecting the engine load, and brake drive means for operating a vehicle's brake to a predetermined extent for a predetermined time when the mode is the manual shift mode and the engine load is not more than a predetermined value.

Regarding the brake control device disclosed in the above-referenced publication, when the mode is the manual shift mode and the engine load is not more than a predetermined value, the brake drive means operates the vehicle's brake to a predetermined extent for a predetermined time. Thus, in the case where the mode is the manual shift mode in which manual shift is performed requiring engine braking and the automatic transmission is in the neutral state, the vehicle's brake is operated. In this way, a braking force can be exerted on the vehicle in the manual shift mode.

In the case of the operation device disclosed in Japanese Patent Laying-Open No. 2001-200929, however, when the shift range is changed for example from the 5 range in 3rd gear to the 4 range or 3 range, the gear is kept in 3rd gear. In this case, the braking force generated by the engine brake cannot be obtained. Therefore, there is a problem here that perceived deceleration as intended by the driver cannot be obtained.

In the case of the brake control device disclosed in Japanese Patent Laying-Open No. 63-038060, unless the automatic transmission is in the neutral state while gear shifting is done, the braking force generated by the brake cannot be obtained. If gear shifting is not done, the neutral state does not occur. Therefore, like the case of the operation device disclosed in Japanese Patent Laying-Open No. 2001-200929, the braking force generated by the engine brake cannot be obtained when the gear is maintained in the manual shift mode. Further, if the automatic transmission is a CVT (Continuously Variable Transmission), the transmission does not become the neutral state while shifting is done and thus the braking force generated by the brake cannot be obtained. Therefore, there is a problem here that perceived deceleration as intended by the driver cannot be obtained.

DISCLOSURE OF THE INVENTION

The present invention has been made to solve the problems as described above. An object of the invention is to provide a control device for a vehicle that can give perceived deceleration as intended by the driver.

A control device for a vehicle according to the present invention controls the vehicle equipped with an automatic transmission capable of changing a gear ratio by shift operation of a driver. The control device includes a brake unit applying a braking force to the vehicle, a judgment unit judging whether or not a variation of the gear ratio when the shift operation of the driver is performed is within a predetermined range; a determination unit determining whether or not the driver has an intention to decelerate the vehicle; and a control unit controlling the brake unit so that the vehicle is decelerated when the shift operation of the driver is performed, under the conditions that it is determined that the driver has the intention to decelerate the vehicle and that it is judged that the variation of the gear ratio is within the predetermined range.

In accordance with the present invention, even if the driver operates the shift lever, deceleration as intended by the driver is not effected when gear shifting is not effected (variation is zero) or the variation of the gear ratio is small, since the braking force to be applied by the engine brake does not increase as expected by the driver. In this case, if it is determined that the driver has the intention to decelerate the vehicle based on the state where the accelerator pedal position is 0 or the state where the accelerator pedal position is suddenly decreased, the brake means is controlled so that the vehicle is decelerated. Accordingly, the vehicle is decelerated. Thus, the deceleration is effected as intended by the driver. As a result, the control device for the vehicle can be provided that can give perceived deceleration as intended by the driver.

Preferably, the brake unit applies the braking force to the vehicle by suppressing wheel rotation of the vehicle by a frictional force.

In accordance with the present invention, the vehicle can be decelerated by suppressing the rotation of wheels.

Still preferably, the brake unit applies the braking force to the vehicle by increasing a load of a driving source of the vehicle.

In accordance with the present invention, the vehicle can be decelerated by increasing the load of the driving source and thereby increasing the engine-braking force.

Still preferably, the determination unit determines whether or not the driver has the intention to decelerate the vehicle based on operation of an accelerator pedal by the driver.

In accordance with the present invention, in the case where the accelerator pedal position is 0 or the accelerator pedal position is suddenly decreased, it can be determined that the driver has the intention to decelerate the vehicle.

BEST MODES FOR CARRYING OUT THE INVENTION

Figure 1:
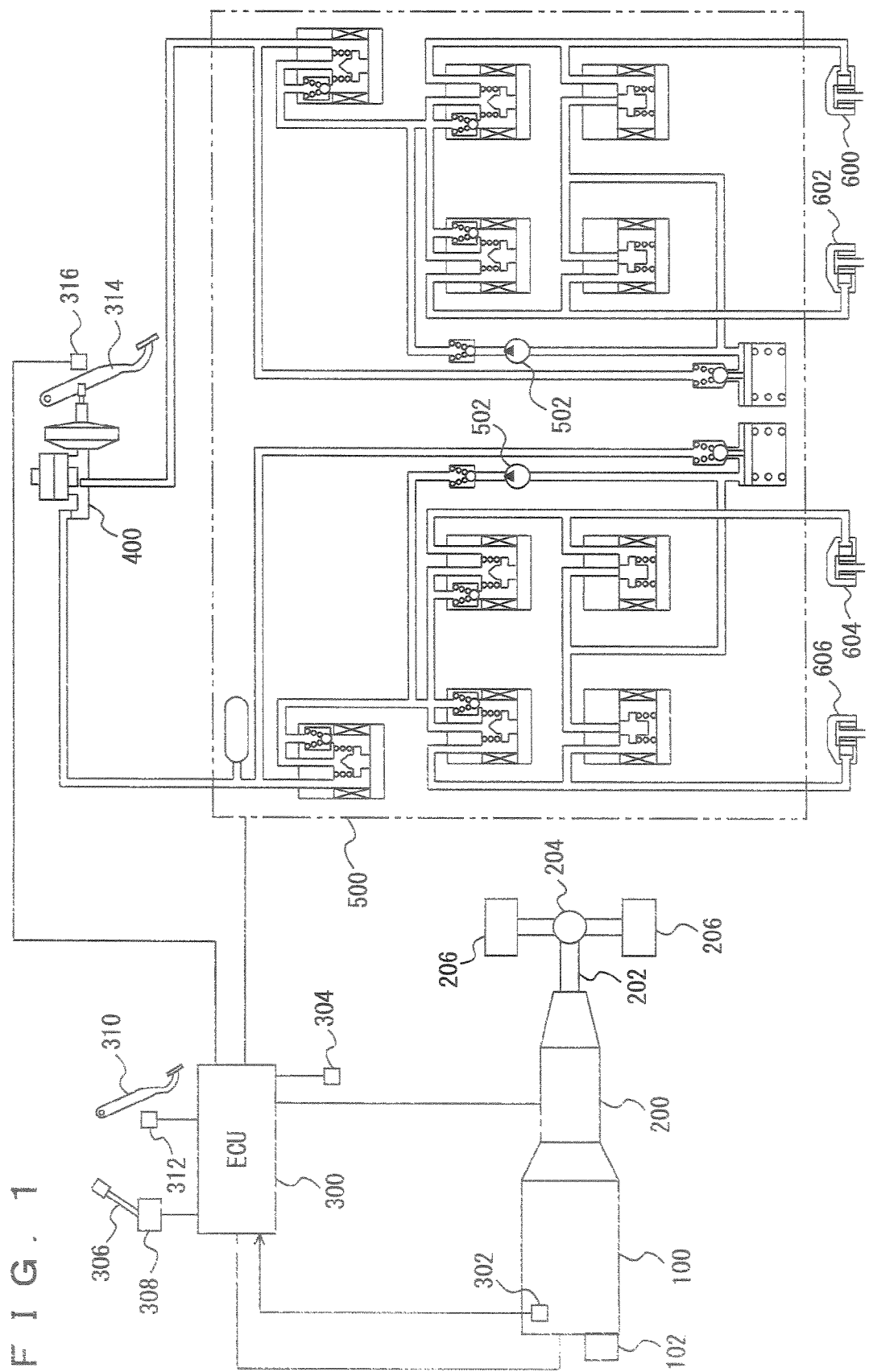
FIG. 1 is a control block diagram showing a vehicle equipped with a control device according to the present embodiment.

Embodiments of the present invention are hereinafter described. In the following description, like components are denoted by like reference characters. They are named identically and function identically. Therefore, a detailed description thereof is not repeated.

Referring to FIG. 1, a description is given of a vehicle equipped with a control device according to the present embodiment. The vehicle runs using a driving force generated by an engine 100 and transmitted to wheels 206 through a transmission 200, a propeller shaft 202 and a differential 204. While the drive system of the vehicle in the present embodiment is FR (Front engine Rear drive), any drive system other than the FR may be used.

To a crankshaft (not shown) of engine 100, an alternator 102 is coupled via a belt. Alternator 102 is driven by a driving force generated by engine 100 to generate electric power.

Transmission 200 is configured with a planetary gear unit. Transmission 200 is controlled by an ECU 300 so that gear shifting is done automatically according to the vehicle speed and the accelerator pedal position. The control device of the present embodiment is implemented, for example, by a program executed by ECU 300.

Transmission 200 may be a CVT. Further, transmission 200 may be configured with constant-mesh gears instead of the planetary gear unit.

To ECU 300, from a vehicle-speed sensor 304, a position switch 308 detecting the position of a shift lever 306, an accelerator position sensor 312 detecting the pedal position of an accelerator pedal 310, and a stop lamp switch 316 detecting whether or not a brake pedal 314 is depressed, respective signals indicating the results of the detection are transmitted.

A driver operates shift lever 306 to select, from a plurality of shift ranges, a shift range corresponding to the position of shift lever 306. ECU 300 controls transmission 200 so that gear shifting is done with a gear ratio that is set in association with the selected shift range. The shift range may be changed to a higher or lower range one by one each time the driver operates shift lever 306 in the forward or backward direction or the vehicle width direction. Further, a shift range may be selected by operation of a switch by the driver that is provided on a steering wheel (not shown) or steering column (not shown). Furthermore, instead of selecting a shift range, a gear may be selected.

Brake pedal 314 is coupled to a master cylinder 400. A hydraulic pressure generated in master cylinder 400 is directed via a brake actuator 500 to calipers 600 to 606 provided on respective wheels.

Brake actuator 500 controls opening and closing of a solenoid valve to direct the hydraulic pressure generated at a pump 502 to each caliper and thereby control the brake hydraulic pressure. Brake actuator 500 is controlled by ECU 300. The calipers may be operated by an electric motor for example.

Figure 2:
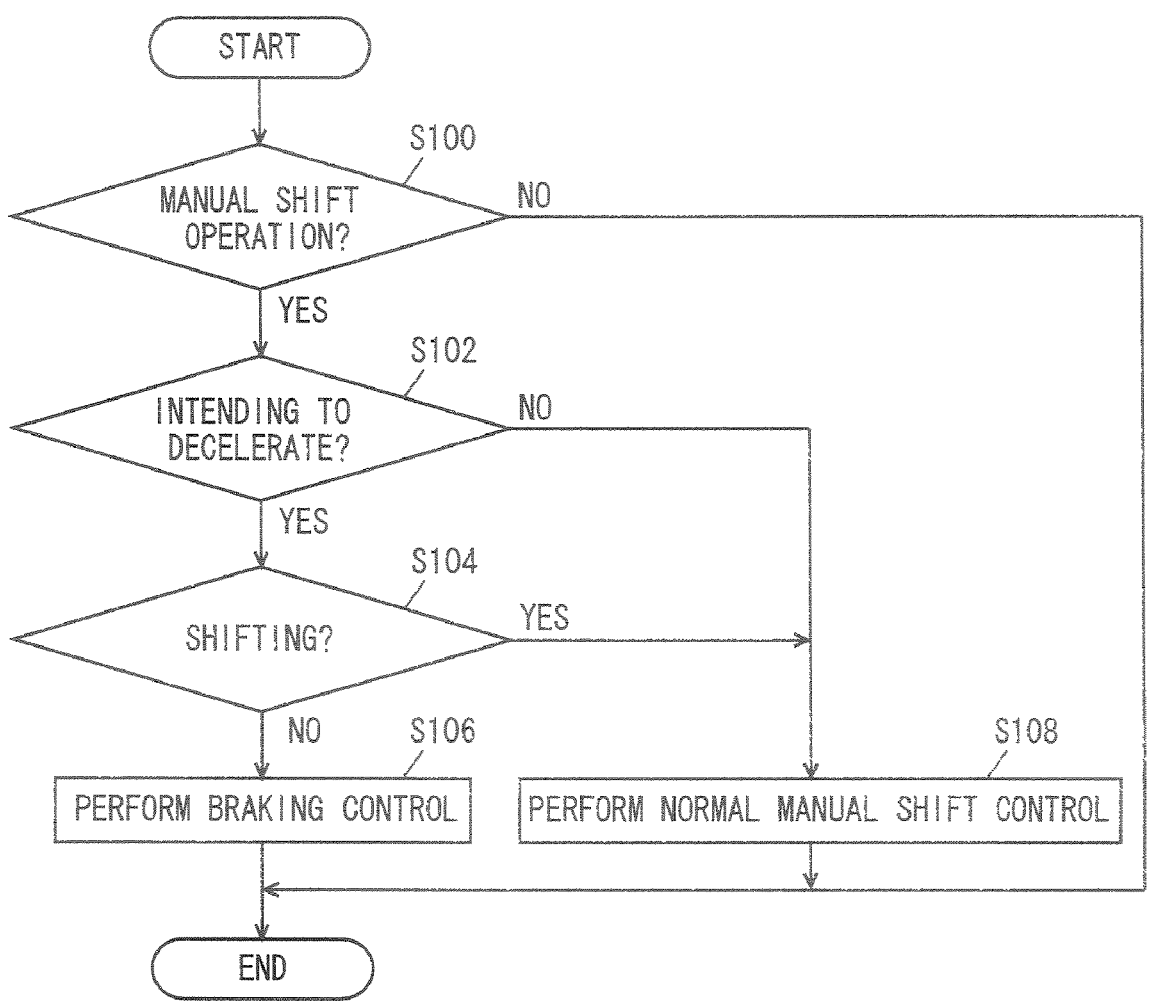
FIG. 2 is a flowchart showing a control structure of a program executed by an ECU (Electronic Control Unit) of the control device in the present embodiment.

Referring to FIG. 2, a description is given of a control structure of a program executed by ECU 300 of the control device according to the present embodiment.

In step (hereinafter abbreviated as S) 100, ECU 300 determines, based on a signal transmitted from position switch 308, whether or not the shift range is changed to a lower range through operation of shift lever 306 by a driver (manual shift operation). When the manual shift operation is performed (YES in S100), the process proceeds to S102. Otherwise (NO in S100), the process is ended.

In S102, ECU 300 determines whether or not the driver has the intention to decelerate. Based on at least one of the accelerator pedal position detected by accelerator position sensor 312 and the rate of change of the accelerator pedal position, ECU 300 determines whether or not the driver has the intention to decelerate. ECU 300 determines that the driver has the intention to decelerate when the accelerator pedal position is 0 or when the accelerator pedal position is decreased and the rate of change of the accelerator pedal position is higher than a predetermined rate of change. When the driver has the intention to decelerate (YES in S102), the process proceeds to S104. Otherwise (NO in S102), the process proceeds to S108.

In S104, ECU 300 determines, as the shift range is changed to a lower range by the manual shift operation, whether or not transmission 200 is downshifted. Based on a shift map stored in a memory, ECU 300 determines whether or not transmission 200 is downshifted. When the shifting is done (YES in S104), the process proceeds to S108. Otherwise (NO in S104), the process proceeds to S106. In other words, the case where the determination is YES in S104 corresponds to the fact that the variation of the gear ratio is not within a predetermined range, and the case where the determination is NO in S104 corresponds to the fact that the variation of the gear ratio is within a predetermined range.

In S106, ECU 300 performs braking control by directing the hydraulic pressure generated at pump 502 of brake actuator 500 to each caliper and suppressing rotations of the wheels for a predetermined period of time, thereby applying a braking force to the vehicle.

Instead of applying the braking force by brake actuator 500, alternator 102 or any of other auxiliaries may be used to increase the load of engine 100 and thereby apply the braking force to the vehicle by the engine brake.

In S108, ECU 300 performs normal manual shift control of controlling transmission 200 so that gear shifting is done with the gear ratio that is set in association with the selected shift range.

Operation is described of ECU 300 of the control device in the present embodiment based on the above-described structure and flowchart.

When a driver performs manual shift operation for increasing braking force of the engine brake by downshift (YES in S100), it is determined whether or not the driver has the intention to decelerate (S102), When the accelerator pedal position is 0 or when the accelerator pedal position is decreased and the rate of change of the accelerator pedal position is higher than a predetermined rate of change, it can be considered that the driver has the intention to decelerate (YES in S102). When the driver has the intention to decelerate (YES in S102), it is determined, based on the shift map, whether or not transmission 200 is downshifted (S104).

For example, when the shift range is changed from 5 range in 3rd gear to 4 range or 3 range, the gear is kept in 3rd gear. In such a case, there is no downshift and thus the vehicle is not braked by the engine brake. Therefore, the driver does not feel the perceived deceleration as intended by the driver.

As described above, when transmission 200 is not downshifted (NO in S104), the solenoid valve of brake actuator 500 is controlled so that the hydraulic pressure generated at pump 502 is directed to each caliper, thereby suppressing rotations of the wheels for a predetermined period of time (S106).

Figure 3:
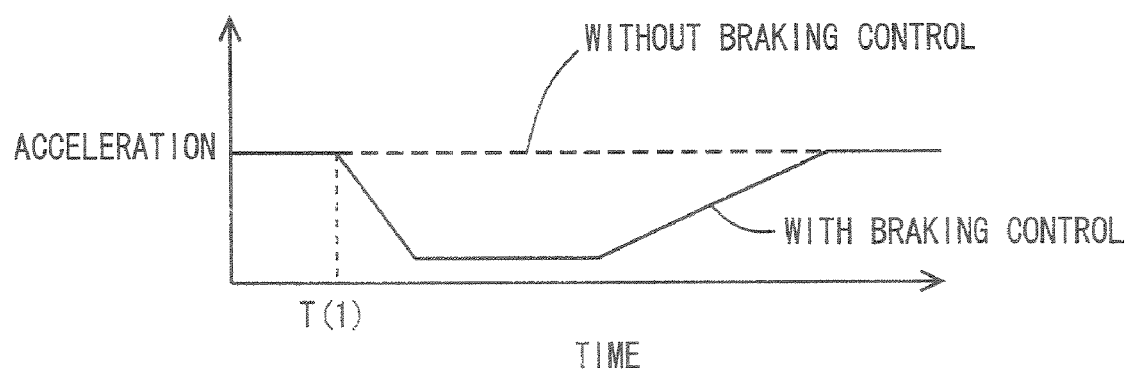
FIG. 3 is a timing chart showing a change of the deceleration with time.

In this way, the braking force is applied to the vehicle. Therefore, as indicated by the solid line in FIG. 3 the acceleration decreases (deceleration increases) from time T(1) and the deceleration corresponding to the state where downshifting is done can be obtained. As a result, the deceleration can be effected as intended by the driver. In FIG. 3, a lower acceleration shows that the braking force is larger.

In contrast, when transmission 200 is downshifted (YES in S104), gear shifting of transmission 200 is done with the gear ratio that is set in association with the selected shift range (S108).

As described above, when the driver performs manual shift operation, the ECU of the control device in the present embodiment determines that the driver intends to decelerate, in the case where the accelerator pedal position is 0 or in the case where the accelerator pedal position is decreased and the rate of change of the accelerator pedal position is higher than a predetermined rate of change. Here, unless the transmission is downshifted, the brake actuator applies a braking force to the vehicle. In this way, deceleration can be effected as intended by the driver.

Here, even if the transmission is downshifted, as long as a variation of the gear ratio is small, the braking force of the engine brake is insufficient and thus the vehicle is not decelerated as intended by the driver. Therefore, even in the case where downshifting is done, the braking force may be applied to the vehicle if the variation of the gear ratio is within a range of a predetermined variation.

The embodiments as disclosed herein are by way of illustration and example in all respects, and are not to be taken by way of limitation. It is intended that the scope of the present invention is defined by claims, not by the description above, and includes all modifications within the meaning and range equivalent to that of the claims.

The invention claimed is:

1. A control device for a vehicle equipped with an automatic transmission capable of changing a shift range by shift operation of a driver, comprising:
   a brake unit for applying a braking force to said vehicle;
   a judgment unit for judging whether or not shifting is effected according to the shift operation of said driver;
   a determination unit for determining whether or not said driver has an intention to decelerate said vehicle; and
   a control unit for controlling said brake unit so that said vehicle is decelerated when the shift operation of said driver is performed, only under the conditions that it is determined that said driver has the intention to decelerate said vehicle and that it is judged that shifting is not effected according to the shift operation of said driver.

2. The control device for the vehicle according to claim 1, wherein
   said brake unit applies the braking force to said vehicle by suppressing wheel rotation of said vehicle by a frictional force.

3. The control device for the vehicle according to claim 1, wherein
   said brake unit applies the braking force to said vehicle by increasing a load of a driving source of said vehicle.

4. The control device for the vehicle according to claim 1, wherein
   said determination unit determines whether or not said driver has the intention to decelerate said vehicle based on operation of an accelerator pedal by said driver.

5. The control device for the vehicle according to claim 2, wherein
   said determination unit determines whether or not said driver has the intention to decelerate said vehicle based on operation of an accelerator pedal by said driver.

6. The control device for the vehicle according to claim 3, wherein
   said determination unit determines whether or not said driver has the intention to decelerate said vehicle based on operation of an accelerator pedal by said driver.

7. A control device for a vehicle equipped with an automatic transmission capable of changing a shift range by shift operation of a driver, comprising:
   brake means for applying a braking force to said vehicle;
   judgment means for judging whether or not shifting is effected according to the shift operation of said driver;
   determination means for determining whether or not said driver has an intention to decelerate said vehicle; and
   control means for controlling said brake means so that said vehicle is decelerated when the shift operation of said driver is performed, only under the conditions that it is determined that said driver has the intention to decelerate said vehicle and that it is judged that shifting is not effected according to the shift operation of said driver.

8. The control device for the vehicle according to claim 7, wherein
   said brake means applies the braking force to said vehicle by suppressing wheel rotation of said vehicle by a frictional force.

9. The control device for the vehicle according to claim 7, wherein
   said brake means applies the braking force to said vehicle by increasing a load of a driving source of said vehicle.

10. The control device for the vehicle according to claim 7, wherein said determination means determines whether or not said driver has the intention to decelerate said vehicle based on operation of an accelerator pedal by said driver.

11. The control device for the vehicle according to claim 8, wherein
said determination means determines whether or not said driver has the intention to decelerate said vehicle based on operation of an accelerator pedal by said driver.

12. The control device for the vehicle according to claim 9, wherein
said determination means determines whether or not said driver has the intention to decelerate said vehicle based on operation of an accelerator pedal by said driver.

* * * * *